(12) United States Patent
Horner et al.

(10) Patent No.: US 7,676,543 B2
(45) Date of Patent: Mar. 9, 2010

(54) ASSOCIATING PRESENCE INFORMATION WITH A DIGITAL IMAGE

(75) Inventors: Richard Mark Horner, Cary, NC (US); Jeffrey Scott Bardsley, Durham, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 1257 days.

(21) Appl. No.: 11/170,709

(22) Filed: Jun. 27, 2005

(65) Prior Publication Data

US 2007/0011186 A1    Jan. 11, 2007

(51) Int. Cl.
*G06F 15/16* (2006.01)
(52) U.S. Cl. .................. 709/204; 709/202; 715/751
(58) Field of Classification Search ......... 709/201–207; 715/751, 753, 758
See application file for complete search history.

(56) References Cited

U.S. PATENT DOCUMENTS

| | | | |
|---|---|---|---|
| 5,689,742 A | 11/1997 | Chamberlain, IV | |
| 6,041,335 A | 3/2000 | Merritt et al. | |
| 6,229,566 B1 | 5/2001 | Matsumoto et al. | |
| 6,351,777 B1 | 2/2002 | Simonoff | |
| 6,408,301 B1 | 6/2002 | Patton et al. | |
| 6,687,878 B1 | 2/2004 | Eintracht et al. | |
| 6,762,777 B2 | 7/2004 | Carroll | 715/808 |
| 6,874,126 B1 | 3/2005 | Lapidous | 715/711 |
| 7,043,529 B1 | 5/2006 | Simonoff | |
| 7,171,113 B2 | 1/2007 | Parulski et al. | |
| 2002/0019845 A1 | 2/2002 | Hariton | |
| 2002/0051262 A1 | 5/2002 | Nuttall et al. | |
| 2002/0054112 A1 | 5/2002 | Hasegawa et al. | |
| 2002/0055955 A1 | 5/2002 | Lloyd-Jones et al. | |
| 2002/0141750 A1 | 10/2002 | Ludtke et al. | |
| 2003/0043190 A1 | 3/2003 | Bernius et al. | 345/753 |
| 2003/0233379 A1 | 12/2003 | Cohen et al. | |
| 2003/0235399 A1 | 12/2003 | Kawahara | |
| 2004/0126038 A1 | 7/2004 | Aublant et al. | |
| 2004/0172455 A1 | 9/2004 | Green et al. | 709/207 |
| 2004/0201602 A1 | 10/2004 | Mody et al. | |
| 2004/0243941 A1 | 12/2004 | Fish | 715/752 |
| 2004/0263661 A1 | 12/2004 | Okisu et al. | |
| 2005/0039134 A1 | 2/2005 | Wiggeshoff et al. | 715/752 |
| 2005/0071761 A1 | 3/2005 | Kontio | 715/711 |
| 2005/0071767 A1 | 3/2005 | Kirkland | 715/753 |
| 2005/0091027 A1 | 4/2005 | Zaher et al. | |
| 2006/0004914 A1* | 1/2006 | Kelly et al. | 709/219 |

(Continued)

FOREIGN PATENT DOCUMENTS

JP    2004272490    9/2004

OTHER PUBLICATIONS

Suzuki et al. "New Presence Technologies and Service for the Broadband-network Age", by Suzuki et al., from NTT Technical Review, vol. 1, No. 5, Aug. 2003, 6 pages.*

(Continued)

*Primary Examiner*—David Lazaro

(57) ABSTRACT

The present invention provides a computer-implemented method and system for associating presence information with a digital image. Aspects of the preferred embodiment include allowing an identifier associated with at least one object depicted in the image to be stored as image metadata; using the identifier to associate presence information with the at least one object; and performing an action related to the object using the associated presence information.

41 Claims, 3 Drawing Sheets

U.S. PATENT DOCUMENTS

2006/0005168 A1    1/2006    Singh

OTHER PUBLICATIONS

Van Cleyenbreugel, J., et al., "Annotating Radiological Images for Computer Assisted Communication and Teaching," Computer Communications, Elsevier Science Publishers BV, Amsterdam, NL, vol. 19, No. 6, Jun. 1996, pp. 498-508, XP004052736 ISSN: 0140-3664.

"Implementation of Image Annotation," IBM Technical Disclosure Bulletin, IBM Corp., New York, US, vol. 39, No. 2, Feb. 1996, pp. 25-26, XP000559805 ISSN: 0018-8689.

Day, M., et al., RFC 2778, "A Model for Presence and Instant Messaging" [online] The Internet Society, Feb. 2000 [retrieved on May 6, 2005]; Retrieved from the Internet: <URL:http://www.ietf.org/rfc/rfc2778.txt?number=2778>, 14 pages.

Day, M., et al., RFC 2779, "Instant Messaging / Presence Protocol Requirements" [online] The Internet Society, Feb. 2000 [retrieved on May 6, 2005]; Retrieved from the Internet: <URL:http://www.ietf.org/rfc/rfc2779.txt>, 22 pages.

"CoffeeCup WebCam—Capturing/Viewing Images," [online] Jun. 12, 2004, CoffeeCup [retrieved May 14, 2007] Retrieved from the Internet: <URL: http://web.archive.org/web/20040612224337/www.coffeecup.com/help/webcam/capturingviewing-images.17-075.html> 2 pages.

Bloomsburg University Virtual Training Help Center, "Lesson 14: Selection Tools," [online] Mar. 24, 2003 [retreived on Apr. 28, 2008] Retrieved from the Internet: <URL: http://www.web.archive.org/web/20030324195435/http://lit.bloomu.edu/vthc/Photoshop/BLENDING/selectiontools.htm> 7 pages.

\* cited by examiner

ASSOCIATING PRESENCE INFORMATION WITH A DIGITAL IMAGE

CROSS-REFERENCE TO RELATED APPLICATION

The present invention is related to co-pending U.S. patent application Ser. No. 10/884,395 entitled "Method and System for More Precisely Linking Metadata and Digital Images," filed on Jul. 2, 2004, which is assigned to the assignee of the present application and herein incorporated by reference.

FIELD OF THE INVENTION

The present invention relates to digital images and image metadata, and more particularly to a method and system for associating presence information with a digital image.

BACKGROUND OF THE INVENTION

One advantage of digital cameras over digital film based cameras is that digital cameras have the ability to store data along with a captured image that may later be accessed by a viewer. For example, once the digital image has been transferred from the digital camera to a PC and displayed, a user may also view information about the image, such as date and time of capture, the name of the image, and image size, for instance. Typically, the data regarding a captured image is stored in metadata within the image file of the captured image.

A conventional image file typically includes a header, image data itself, and the metadata. The image file may optionally include a thumbnail image and/or a reference to audio data. The header preferably includes information that identifies and describes the various contents of image file. The image data contains actual captured image data, the resolution of which depends on the settings of the image capture device (e.g., camera, scanner, and the like). The image metadata stores various types of data that correspond and relate to the image data. The image metadata may be populated by the image capture device at the time of image capture, or subsequent to image capture by a user when cataloging the images.

The image metadata may comprise system metadata and user metadata. System metadata is typically populated by the image capture device and includes various types of camera information that preserve command settings at the moment of capture and correlate with the captured image data. For example, system metadata may indicate focus setting, aperture setting, and other relevant information that may be used for effectively processing or analyzing the corresponding image data. The data written to the system metadata is controlled by the camera or scanner and cannot be modified by the user.

The user metadata, in contrast, enables the storage of data that the user enters on either a PC or on the image capture device. For example, most, if not all, images depict a scene that includes multiple objects (e.g., people, buildings, landmarks, nature, etc.). The user may wish to identify these objects by entering metadata describing the objects. Image applications exist that enable the user to do so by entering this information in text format. The text is then stored as user metadata and associated with the image. When the image is subsequently displayed using the same or a different image application, the metadata associated with the image is made available to the viewer. For example, the metadata may be displayed and/or printed as text along with the image.

Although the conventional metadata allows the user to more fully describe the objects appearing in the image, there are limitations to the metadata. For instance, the metadata may not adequately describe the image. In particular, if the metadata describes more than one object depicted in an image, the user often has a difficult time determining which descriptions pertain to which object. For example, assume an image depicts two people and two houses, and the metadata identifies the individual's names (e.g., Richard and Scott), as well as the houses (e.g., Richard's house and Scott's house) in the image. In this case, a viewer who does not know Richard or Scott may be unable to correlate the names with the individuals and to the houses solely on the basis of the metadata that was provided in this example. The user who entered the metadata may be able to provide more specific metadata (e.g., Richard is on the left and Scott is on the right). However, this places a greater burden on the user to enter more information and requires the user to more carefully choose the terms used in the metadata.

In addition, while looking at a digital image taken in years past, it would be beneficial to users who view the image to be reminded or notified who (or what) is depicted in the image and whether or not the object(s) in the image are available for communication. Existing image applications fail to provide this functionality.

BRIEF SUMMARY OF THE INVENTION

The present invention provides a computer-implemented method and system for associating presence information with a digital image. Aspects of the preferred embodiment include allowing an identifier associated with at least one object depicted in the image to be stored as image metadata; using the identifier to associate presence information with the at least one object; and performing an action related to the object using the associated presence information, including displaying the presence information in association with the object when the image is viewed.

According to the method and system disclosed herein, by using an identifier to associate presence information to a viewer in conjunction with the image and displaying the presence information with the image, the viewer is thereby informed who or what is depicted in the image and whether or not the object(s) in the image are available for communication. If presence information includes status, then the viewer is informed whether the identified object is available for real-time communication. In a further embodiment, the action performed related to the object may include opening a communication channel via a communication address included in the presence information to initiate a communication session with the identified object.

DETAILED DESCRIPTION OF THE INVENTION

The present invention relates to associating presence information with digital images. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method for associating presence information with one or more objects depicted in a digital image. The presence information may then be used when the image is accessed to indicate not only who the people are (in the case where the objects are people), but also whether any of the people are available for communication, including real-time communication via chat or telephone, and/or non-real-time communication via e-mail or postage.

Figure 1:
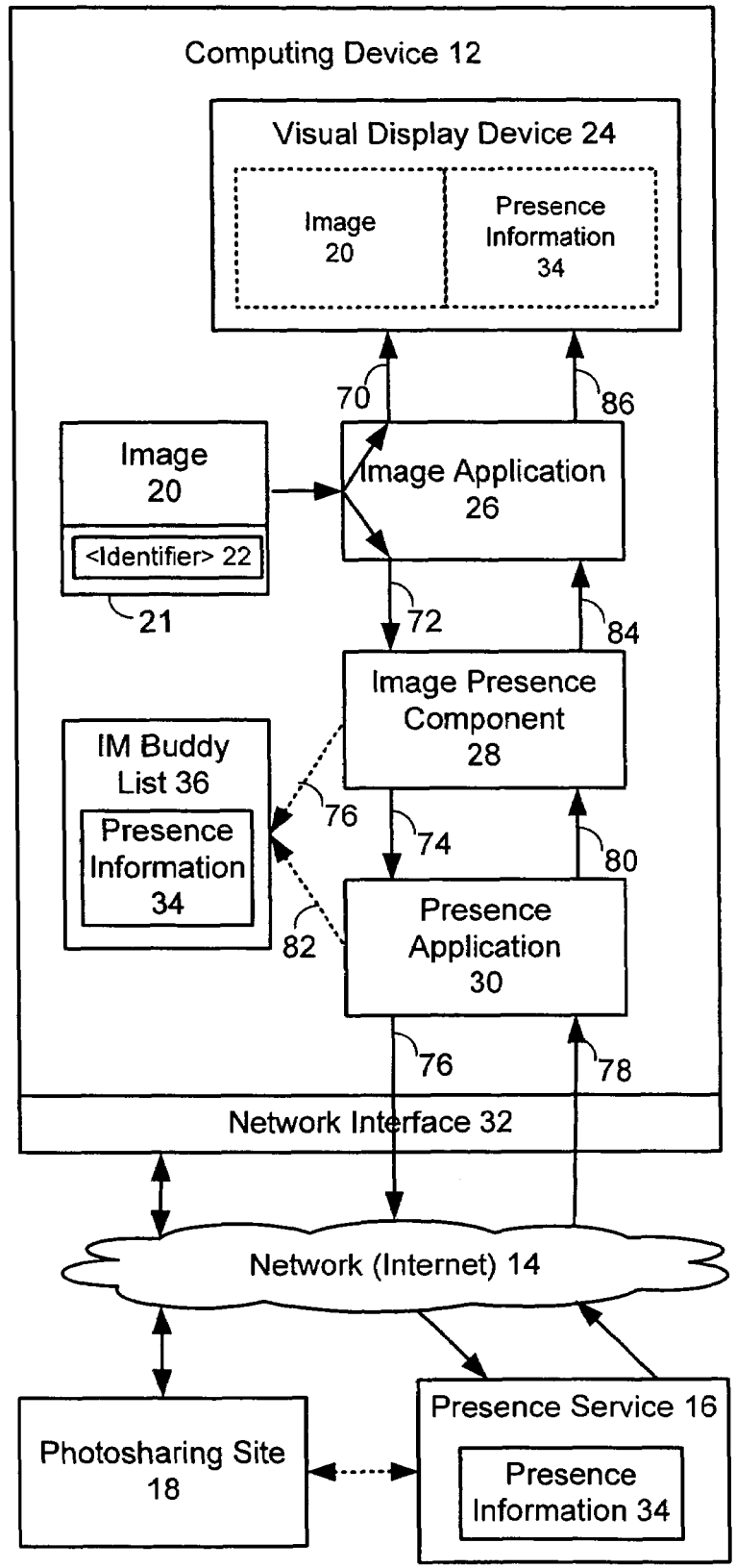
FIG. 1 is a block diagram illustrating a system for associating presence information with objects depicted in a digital image in accordance with a preferred embodiment of the present invention.

FIG. 1 is a block diagram illustrating a system for associating presence information with objects depicted in a digital image in accordance with a preferred embodiment of the present invention. The system 10 includes one or more computing devices 12 in communication with a presence service 16 and an optional photosharing site 18. The computing device 12, which may be any electronic device, such as a camera phone, web-enabled digital camera, PDA, PC or photo kiosk, for example, includes a visual display device 24 and a network interface 32. Examples of the display device 24 may include LCD, OLED, Plasma, or a projector, and examples types of network interfaces 32 include Ethernet, wireless, or a dial-up connection, which may access the network 14 (Internet) through a LAN or WAN.

A digital image 20 accessible by the computing device 12 is shown having associated image metadata 21 that describes and/or categorizes the image 20. The Exchangeable Image File Format for Digital Still Camera (EXIF) is an example of an international digital still camera image file format standard that supports attachment of tags to image files. The images 20 may be stored as any file type including jpeg, tiff, or bmp, but may but also include video clips, and audio. The images 20 may be captured by the computing device 12 or may be input from a variety of sources (not shown), such as a digital camera, CD, DVD, or a scanner, for instance. The image 20 may be stored on a storage device (not shown), such as a hard drive, CDR, DVDR, or an imaging device attached to the computing device 12.

An image application 26 capable of opening and displaying image data, such as an image viewer, a web browser, an instant messenger (IM) application, an operating system (OS), or other graphical user interface, opens and displays the image 20 on the visual display 24. The presence application 30, which may comprise an IM application, an email application, or other software application that utilizes presence information, accesses the presence service 16. The presence service 16 accepts information, stores presence information 34, and distributes the presence information 34 to requesting services, including the presence application 30.

According to the preferred embodiment, the computing device 12 is further provided with an image presence component 28, which in conjunction with the image application 26 and the presence application 30, uses the identifier 22 to associate presence information 34 with the identified object and to make the presence information available to a user, as explained below.

Figure 2:
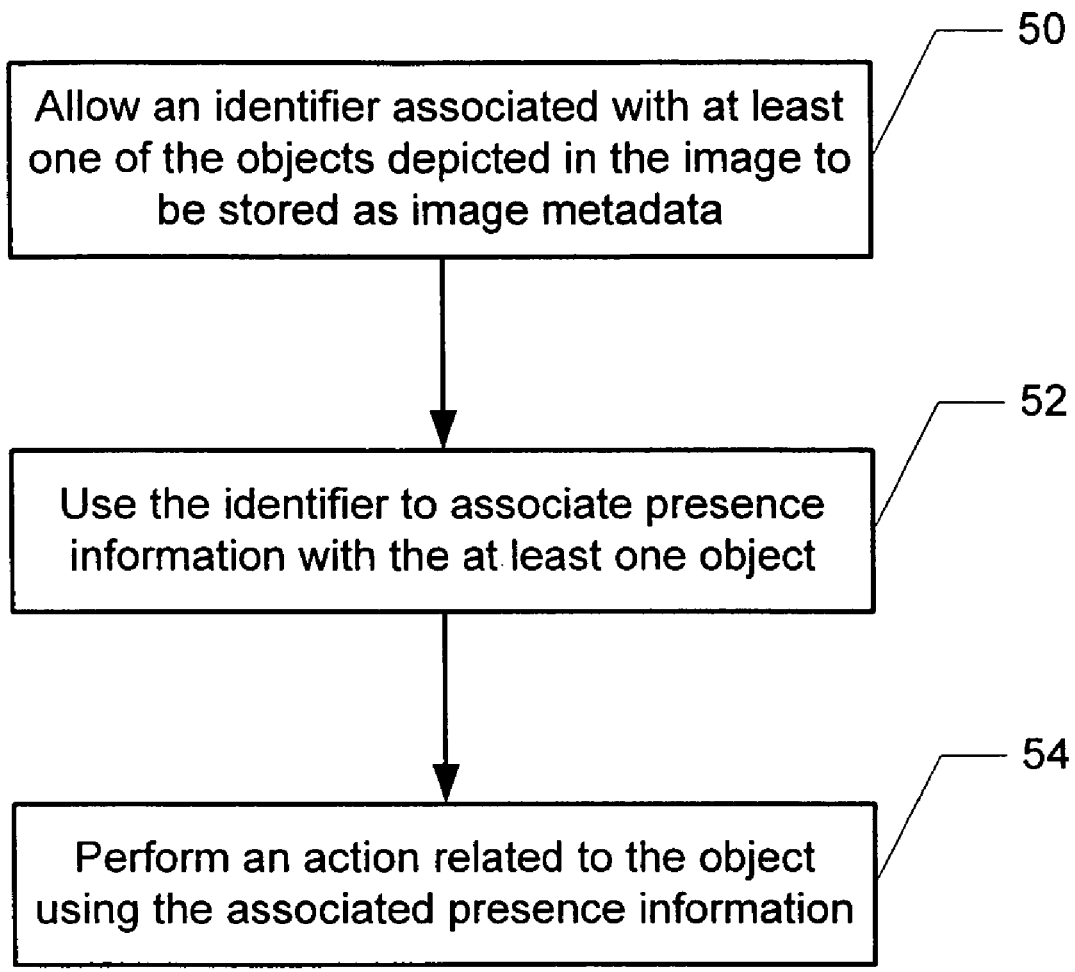
FIG. 2 is a flow diagram illustrating a process for associating presence information with a digital image in accordance with a preferred embodiment of the present invention.

FIG. 2 is a flow diagram illustrating a process for associating presence information with a digital image 20 in accordance with a preferred embodiment of the present invention. Referring to both FIGS. 1 and 2, the process begins in step 50 by allowing an identifier 22 associated with at least one of the objects depicted in the image 20 to be stored as image metadata 21. In a preferred embodiment, the identifier 22 is a means of indicating a point of contact, intended for public use such as on a business card. Names, telephone numbers, email addresses, postage address, and typical home page URLs are all examples of identifiers. However, in an alternative embodiment, in some business contexts, the identifier 22 may include information that is not intended for the public, such as employee and account numbers.

Although only one identifier 22 is shown, the image 20 may include multiple identifiers 22 that are associated with multiple objects depicted in the image 20 or multiple portions of the image may be associated with different identifier 22. As stated above, the metadata 21 may be part of the image file 20, or stored separately from the image 20 file.

In one embodiment, the user may populate the metadata 21 with the identifier 22 using either the image applications 26 or the image presence component 28. In an alternative embodiment where the computing device 12 is a PC, the metadata 21 may be populated with the identifier 22 on an image capture device, such as a digital camera, capable of running the appropriate software.

In one embodiment, the identifier 22 may be associated with a particular object depicted in the image 20 using the method disclosed in co-pending U.S. patent application Ser. No. 10/884,395 entitled "Method and System for More Precisely Linking Metadata and Digital Images," (3204P/I249) filed on Jul. 2, 2004, which is assigned to the assignee of the present application and herein incorporated by reference. In this method, the user selects a portion of the image 20 containing the object to which the user wishes to associate an identifier 20 using an application, such as the image application 26. In one embodiment, the user selects a graphical element and positions the graphical element over the object or objects with which the identifier 22 is to be associated. For example, rectangles, ovals, circles, or other forms may be provided as preset shapes, or the user may simply draw a box or rectangle around the object using the cursor. After selecting the object, the user enters the identifier 22. Although the identifier 22 may be typically entered as text, the identifier 22 may be provided in audio format. After the identifier 22 is entered, and identifier 22 is saved in the metadata 21 in association with the selected object. In one embodiment, the identifier 22 is stored with particular x-coordinates and y-coordinates of the object selected. For example, if a rectangular graphical element is selected, sized, and positioned around the object(s), then the identifier 22 is stored in the metadata 21 with the x-coordinates and y-coordinates of the rectangular graphical element. Using this method, the identifier 22 can be associated with a selected object in the image 20, rather than only with the entire image. Repeating this process, the user can easily identify multiple objects in the image 20.

In one embodiment, the identifier 22 for multiple objects in the image 20 may be stored in a single metadata tag. In another embodiment, the identifier 22 for multiple objects in image 20 may be stored in separate metadata tags. In a preferred embodiment, the x, y coordinates are stored in a separate metadata tag from the identifier 22. In an alternative embodiment, however, the x, y coordinates may be stored in the same metadata tag as the identifier 22.

After the image 20 and the identifier 22 are made available, in step 52, the identifier 22 is used to associate presence information with the object. As is well-known in the art, presence is a medium of communications over a network that is a means for finding, retrieving, and subscribing to changes in the presence information (e.g., "online" or "offline") of other principals (i.e., real-world objects such as people or programs) where each of these principals users has presence information associated with them. A principal is indirectly associated with a presence uniform resource identifier (URI) or uniform resource locator (URL) via the principal's presentity. A presentity (not shown) is the entity that supplies the presence information of the principal to the presence service 16.

As described in *A Model for Presence and Instant Messaging* (RFC 2778) and *Instant Messaging/Presence Protocol Requirements* (RFC 2779) published by the IMPP WG, the format of the presence information may include an arbitrary number of elements, called presence tuples. Each presence tuple includes a status that conveys status information (such as online, offline, busy, away, do not disturb) of a particular principal/presentity (e.g., user), an optional communication address, and optional other presence markup. A communication address includes a contact means and a contact address. One type of contact means is instant message service, where the corresponding contact address is an instant inbox address. However, a contact means may also indicate one or more of the following: some form of telephony, for example, with a corresponding contact address containing a telephone number; email communications with a corresponding contact address containing an email address; or a physical mail service with a corresponding contact address containing a postal address. Thus, broadly speaking, the presence information includes general contact information for the principal, such as name, telephone number, email address, postal address, and IP addresses or URLs associated with the object, and the like.

As used herein, the definition of presence information 34 is expanded such that presence information 34 may be associated with inanimate objects in addition to people, and the presence information 34 associated with the object may also include general contact information for the object in addition to, or in lieu of, the presence information as defined in RFC 2778 and RFC 2779. That is, if the presence information 34 associated with an object does not include a status, then the presence information 34 provided may be just general contact information.

In a preferred embodiment, the identifier 22 is used to associate presence information 34 with the identified object when the corresponding image 20 is accessed as follows. Referring to FIG. 1, when the image 20 is accessed for display, for example by the image application 26, the image application 26 sends the image data to the visual display 24 via a line 70 and passes the metadata 21 to the image presence component 28 via line 72. The image presence component 28 parses the metadata 21, and extracts any identifier 22 found. The image presence component 28 then determines whether the identifier 22 is a type sufficient to directly obtain the presence information associated with the identified object (e.g., a presence URL). In addition, the image presence component 28 examines the computing device configuration and determines the most appropriate method to obtain presence information associated with the object based on the computing device configuration and the type of identifier 22.

If the identifier 22 is a type sufficient to directly obtain the presence information associated with the identified object (e.g., is a presence URL), then the identifier 22 is used to associate the presence information 34 with the identified object according to two embodiments. In one embodiment, the image presence component 28 sends the identifier 22 to the presence application 30 via line 74, and the presence application 30 uses the identifier 22 to subscribe to the presence service 16 via line 76 to obtain the presence information 34 via line 78. In this embodiment, the presence information 34 may include presence status and/or contact information, as explained above.

In a second embodiment, the image presence component 28 uses the identifier 22 to retrieve the presence information 34 associated with the identifier 22 found in an entry in a local presence roster list, such as an IM buddy list 36. In this embodiment, the presence information 34 returned from the presence roster list 36 could be the presence status of the object (e.g., "online"). Alternatively, the presence application 30 may query the presence roster list 36 with the identifier 22 to obtain the presence information 34, such as the status. In an alternative embodiment, the presence application 30 retrieves the presence information 34 from the presence roster list 36.

If the identifier 22 is not a type sufficient to directly obtain the presence information associated with the identified object (e.g., is not a presence URL), then the identifier 22 is used as an index to obtain the presence URL via a look-up or mapping operation, and the presence URL is then used to obtain the presence information 34, as explained above. For example, if the identifier 22 is a telephone number or name, then the telephone number or name can be mapped to an email address, which is a sufficient type of presence URL to obtain the presence information 34. Likewise, if the identifier 22 is an address, then the address can be used to obtain a name or telephone number, which can then be used to obtain the presence URL. Prior to performing the lookup or mapping operation, the identifier 22 can be validated to ensure that the format of the data is correct. For example, if the image presence component 28 determines that the identifier 22 is a telephone number, then the presence component 28 can validate that the telephone number has a valid prefix area code and/or the requisite number of digits.

Referring again to 2, after the presence application 30 receives the presence information 34 from the presence service, in step 54, an action related to the object is performed using the associated presence information 34. In a preferred embodiment, the action performed includes displaying the presence information 34 with the image 20, printing the presence information 34 with the image 20, or playing an audio reproduction of the content of the presence information 34 while the image 20 is viewed.

According to the preferred embodiment, by providing the presence information 34 to a viewer in conjunction with the image 20, the viewer is thereby informed who or what is depicted in the image 20 and whether or not the object(s) in the image are available for communication. If the presence information 34 includes status, then the viewer is informed whether the identified object is available for real-time communication.

In a preferred embodiment, means for using the identifier 22 to associate presence information 34 with the least one object and for performing an action related to the object using the presence information 34 includes a combination of the image application 26, the image presence component 28, the presence application 30, and the presence service 16, although the presence application 30 can be eliminated by implementing the presence component functionality in the image presence component 20 itself.

Referring again to FIG. 1, in a preferred embodiment, the presence information 34 is displayed as follows. The presence application 30 passes the presence information 24 to the image presence component 28 via line 80, the presence component 28 passes the presence information 34 to the image application 26 via line 82, and the image application 26 displays the presence information 34 via line 86. In an alternative embodiment, the image presence component 28 is used to provide the presence information 34 to the visual display 24 so that all the presence information 34 appears in the same format, regardless of whichever image application 26 is used.

The presence information 34 may be displayed in a variety of ways. In one embodiment, the presence information 34 may be displayed next to the image 20. In another embodiment, the presence information 34 may be displayed in a window separate from the image 20. Also, the presence information 34 from several presence IDs in one or more images 20 may be displayed as a group.

Figure 3:
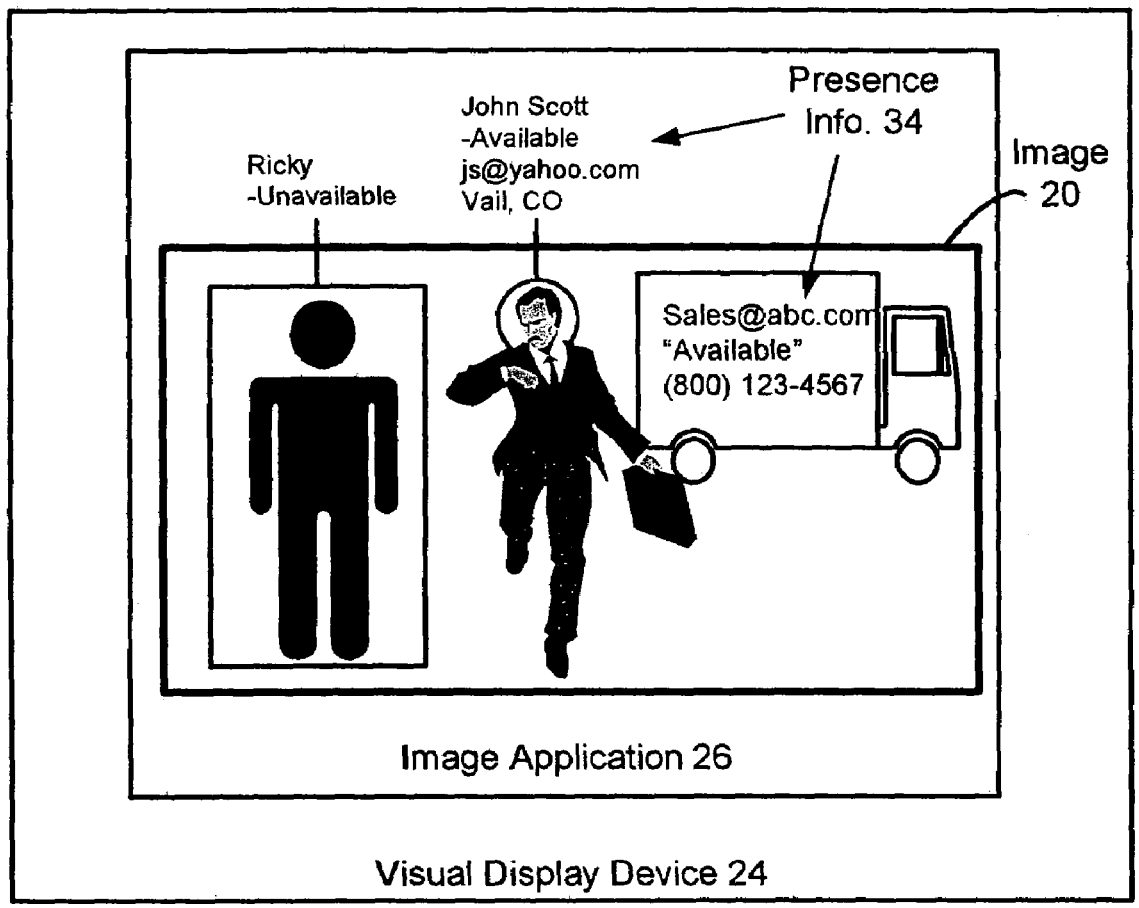
FIG. 3 shows an image with multiple identified objects, each having associated presence information where the presence information for each object is clearly indicated.

In a preferred embodiment, the presence information 34 is displayed over, or points to, a specific location in the image indicated by the x, y coordinates associated with the identifier 22, as illustrated in FIG. 3. FIG. 3 shows an image 20 with multiple identified objects, each having associated presence information 34 where the presence information 34 for each object is clearly indicated. Note, some of the objects may include a status, while others may not, in which case only contact information would be shown.

In another embodiment, the presence information 34 may be converted to HTML so that when a user moves a cursor or pointer over the region of the image 20 encompassed by the x, y coordinates, the presence information 34 is made available. For example, if the presence information 34 is text or sound, the presence information 34 may be displayed or heard, respectively, when the user passes a cursor or pointer over the portion of the image containing the identified object. In this embodiment, the user is allowed to manually access the presence information 34.

In a further embodiment, the action performed related to the object using the associated presence information 34 includes opening a communication channel via the communication address associated with the object. After the presence information is displayed, the user can manually contact the identified object by bringing up a communication method of choice, such as instant messenger, using any contact addresses displayed. Or the image presence component can be configured to automatically start a default communication method using communication means included in the computing device 12, such as invoking the instant messenger application when a user clicks on the presence status and opening a communication channel to the identified object using the network interface 32. In another embodiment, a viewer may click on the displayed presence information 34, which in turn, brings up a menu showing the connection options, such as email, chat, or phone.

In a further embodiment, the computing device may upload the image 20 to the photosharing site 18 for sharing the image 20 with others. When photosharing site 18 receives requests to view the image 20, the photosharing site 18 may then use its own or an external image presence component 28 to extract the identifier 22 from the metadata 21, and use the identifier 22 to obtain the presence information 34, as explained above. Once connected to the network 14, the computing device 12 has the capability of accessing images 20 hosted on the photosharing site 18 for viewing, in which case the photosharing site 16 would display the presence information 34 along with the image 20.

Several user scenarios are provided below to further illustrate operation and advantages of the system 10 for associating presence information 34 with digital images 20.

Scenario 1

Sally is looking at digital images on her PC. She clicks on an image of her sister Kate, which includes Kate's email address as the identifier 22. The image application 26 extracts the email address i.e. kate@hotmail.com (or presence URL, see Jabber specs i.e. jabber.//kate@hotmail.com/MSN) of Kate from the image metadata 21 and connects to the presence service 16 (via the presence component 28 and presence application 30) to check Kate's presence status. The presence service 16 returns presence information 34 indicating that Kate is "Available" and can be contacted by chat or email. The image application 26 displays a green icon on top of Kate's image to show that she is "Available". Sally sees that Kate is available and clicks on the green icon, which brings up a menu showing the connection options of email or chat. Sally selects chat, so the image application 26 starts the default chat application on the PC and instructs it to start a new chat session using Kate's email address as the person to contact. Sally and Kate then chat.

Scenario 2

Eric is looking at an image of his family on his mobile phone. Each family member has a telephone number identifier 22 associated with them. The image contains metadata 21 that describes for each telephone number the location on the image that the person appears. Eric presses a "Determine Status" key on his phone. In response, the phone's image application 26 extracts the telephone numbers from the image metadata 21 and adds them as contacts to the phones presence component 28. The image application 26 requests the presence for all the telephone numbers in the image from the presence component 28. When the presence component 28 receives the presence information 34, the presence component 28 passes the presence information to the image application 26, which combines the location information with the presence information 34 to display presence status over the image. So for those who are available the word "Available" appears over their image.

Scenario 3

Michael is looking at digital images on his photosharing site 16. The photosharing site 18 reads the metadata 21 of all the images and extracts email addresses, telephone numbers, IP addresses and screen names. It uses a built-in presence service 18 to obtain the presence and location of all the contacts. The photosharing site 18 shows Michael all the images in his album and a consolidated list of all the contacts with their presence and location. He sees that his friend John is "Available" and his location is "Vail, Colo., USA". He also sees that the ski team mascot, Hugs the stuffed Bear, is "Busy" and is located in "Vail, Colo., USA". He decides to telephone John and ask him to take some more images of Hugs in action on the slopes.

Scenario 4

Jean is looking at an image of a friend. She selects the image and selects the "Determine Presence" option (Sally has configured the image application 26 not to automatically determine presence). The image presence component 28 searches the image metadata 21 and finds the identifier "John Brown of Raleigh, N.C., USA." The image presence component 28 then performs a search of a contact database on the Internet using John's name and location to retrieve John's email address. The image presence component 28 then passes his email address to the presence service 16. The presence service 16 finds a match for two presence URL's that are associated with the email address, one for John and one for John II, which are returned and displayed on Jean's device. Jean picks the one for John, assuming that John II is his son, and the application retrieves the presence status for John if it was not already returned with the presence URL's. The image application 26 or image presence component 28 highlights the face of John on the image with a blue glow indicating that he is "Available" and updates the image's metadata 21 with a presence tag set to "Available".

Scenario 5

The ABC Company operates a heavy construction equipment rental and sales business. The company website contains a catalogue of images depicting the equipment that the company has available. Chuck is the employee in charge of the company website and decides to utilize a new technology which can include presence in relation to an image. Chuck wants to combine this technology with the instant messenger addresses of the sales people and the equipment images on the company website. The sales people are specialized in handling the rental and sale of various types of equipment. Bob Smith handles all transactions dealing with bull dozers and Jane Doe is responsible for all excavators. Chuck's intention is to allow customers who visit ABC's website to click on an image and be connected to the sales person via an instant messenger chat. Now customers can be in direct communication with a sales person who can best answer questions in relation to the image that they clicked on.

The company has just purchased a JCD MX42 bull dozer, so Chuck takes a digital image of it and loads it into an image editor. In the editor he uses the image metadata editor to create a tag called "Sales Presence Id" and assigns it the presence URL of Bob Smith (jabber://bob.smith@abc.com/IM) the dozer sales contact. Chuck uploads the image to the company website.

Jake is a customer looking for the new JCD MX42 bull dozer, so he checks the ABC website. Finding the JCD MX42 bull dozer he clicks on the image. His web browser searches all the image metadata 21 looking for a presence URL, it finds one for Bob Smith. The browser makes a request to the ABC presence server for Bob Smith's presence information 34. The presence server returns his status as "Available", so the browser displays a green icon on the image of the JCD MX42 bull dozer. Jake has a question about the new dozer, so he clicks on the green icon and the browser uses the presence URL to start a chat session between Jake and Bob Smith. Jake sends a message asking if the new dozer has GPS. Bob Smith replies that it has GPS, so Jake places a rental order.

A method and system for associating presence information with a digital image has been disclosed. The present invention has been described in accordance with the embodiments shown, and one of ordinary skill in the art will readily recognize that there could be variations to the embodiments, and any variations would be within the spirit and scope of the present invention. For example, the viewer may be required to be authenticated for obtaining presence information (e.g., by entering a username and password). Accordingly, many modifications may be made by one of ordinary skill in the art without departing from the spirit and scope of the appended claims.

We claim:

1. A computer-implemented method for associating presence information with a digital image, comprising:

allowing an identifier associated with at least one object depicted in the image to be stored as image metadata;

determining, in connection with a displaying of the image, whether the identifier is sufficient for obtaining presence information associated with the at least one object from at least one of a presence application and a presence roster list;

using the identifier to associate the presence information with the at least one object, including obtaining the presence information from the at least one of a presence application and a presence roster list if it is determined that the identifier is sufficient for obtaining presence information associated with the at least one object; and performing an action related to the object using the associated presence information;

wherein at least one of allowing an identifier to be stored as image data, determining whether the identifier is sufficient for obtaining presence information, using the identifier to associate the presence information with the at least one object, and performing an action is performed by a computing device.

2. The method of claim 1 further including: using a plurality of identifiers for associating respective presence information with corresponding multiple objects depicted in the image.

3. The method of claim 1 further including: after the presence information is associated with the least one object, uploading the image and the associated presence information to a server on a network.

4. The method of claim 1 wherein performing an action includes at least one of displaying the presence information associated with the object in response to a request to view the image, printing the presence information with the image, and playing an audio reproduction of the content of the presence information while the image is viewed.

5. The method of claim 4 further including: displaying the presence information in a location including one of next to the image, over a location of the object in the image, and in a separate window.

6. The method of claim 4, wherein the presence information displayed includes a status associated with the at least one object.

7. The method of claim 1 further including: providing the presence information with at least one of a status that conveys status information and a communication address.

8. The method of claim 7 wherein the communication address specifies at least one contact means and corresponding at least one contact address associated with the object.

9. The method of claim 7 wherein performing an action includes automatically opening a communication channel via the communication address associated with the object.

10. The method of claim 1, wherein using the identifier to associate presence information with the at least one object includes using the identifier to subscribe to the presence information associated with the object via a presence service.

11. The method of claim 1, wherein using the identifier to associate presence information with the at least one object includes using the identifier to retrieve presence information associated with an entry included in a local roster list, the entry corresponding to the identifier of the object.

12. The method of claim 1 wherein using the identifier to associate presence information with the at least one object includes using the identifier as an index to obtain a presence URL via one of a look-up and mapping operation if the identifier is not of a type sufficient to obtain the presence information from at least one of a presence application and a presence roster list, and then using the presence URL to obtain the presence information.

13. The method of claim 1 wherein performing an action includes displaying corresponding presence information for one or more of the at least one objects pointing to a specific location of the one or more of the at least one objects.

14. A computer-readable medium containing program instructions for associating presence information with a digital image, the instructions for:

allowing an identifier associated with at least one object depicted in the image to be stored as image metadata;

determining, in connection with a displaying of the image, whether the identifier is sufficient for obtaining presence information associated with the at least one object from at least one of a presence application and a presence roster list;

using the identifier to associate the presence information with the at least one object, including obtaining the presence information from the at least one of a presence application and a presence roster list if it is determined that the identifier is sufficient for obtaining presence information associated with the at least one object; and performing an action related to the object using the associated presence information.

15. The computer-readable medium of claim 14 further including program instructions for: using a plurality of identifiers for associating respective presence information with corresponding multiple objects depicted in the image.

16. The computer-readable medium of claim 14 further including program instructions for: after the presence information is associated with the least one object, uploading the image and the associated presence information to a server on a network.

17. The computer-readable medium of claim 14 wherein performing an action includes at least one of displaying the presence information associated with the object in response to a request to view the image, printing the presence information with the image, and playing an audio reproduction of the content of the presence information while the image is viewed.

18. The computer-readable medium of claim 17 further including program instructions for: displaying the presence information in a location including one of next to the image, over a location of the object in the image, and in a separate window.

19. The computer-readable medium of claim 17, wherein the presence information displayed includes a status associated with the at least one object.

20. The computer-readable medium of claim 14 further including program instructions for: providing the presence information with at least one of a status that convey status information and a communication address.

21. The computer-readable medium of claim 20 wherein the communication address specifies at least one contact means and corresponding at least one contact address associated with the object.

22. The computer-readable medium of claim 20 wherein performing an action includes automatically opening a communication channel via the communication address associated with the object.

23. The computer-readable medium of claim 14, wherein using the identifier to associate presence information with the at least one object includes using the identifier to subscribe to the presence information associated with the object via a presence service.

24. The computer-readable medium of claim 14 wherein using the identifier to associate presence information with the at least one object includes using the identifier to retrieve presence information associated with an entry included in a local roster list, the entry corresponding to the identifier of the object.

25. The computer-readable medium of claim 14 wherein using the identifier to associate presence information with the at least one object includes using the identifier as an index to obtain a presence URL via one of a look-up or mapping operation if the identifier is not of a type sufficient to obtain the presence information from at least one of a presence application and a presence roster list, and then using the presence URL to obtain the presence information.

26. An image system for a computing device, the image system comprising:

at least one digital image having an identifier associated with at least one object depicted in the image, wherein the identifier is stored as image metadata; and image presence means for determining, in connection with a displaying of the image, whether the identifier is sufficient for obtaining presence information associated with the at least one object from at least one of a presence application and a presence roster list, using the identifier to associate the presence information with the at least one object, including obtaining the presence information from the at least one of a presence application and a presence roster list if it is determined that the identifier is sufficient for obtaining presence information associated with the at least one object, and for performing an action related to the object using the associated presence information wherein at least a portion of the image system is included in the computing device.

27. The system of claim 26 wherein an image application allows a user to associate the identifier with the object by, allowing the user to select a graphical element and position the graphical element over a portion of the image containing the object to which the user wishes to associate the identifier, and allowing the user to enter the identifier, wherein the identifier is saved in the image metadata along with x-coordinates and y-coordinates of the object selected.

28. The system of claim 26 wherein the image presence means includes any combination of the image application, an image presence component, and a presence application.

29. The system of claim 28 wherein the image presence component and the presence application are implemented as one component.

30. The system of claim 28 wherein when the image application accesses the image for display, the image application sends the image data to a display device and passes the metadata to the image presence component.

31. The system of claim 30 wherein the image presence component determines whether the identifier is a type sufficient to directly obtain the presence information associated with the identified object.

32. The system of claim 31 wherein if the identifier is a type sufficient to directly obtain the presence information associated with the identified object, then the image presence component sends the identifier to the presence application, and the presence application uses the identifier to subscribe to a presence service to obtain the presence information.

33. The system of claim 31 wherein if the identifier is a type sufficient to directly obtain the presence information associated with the identified object, then the image presence component uses the identifier to retrieve the presence information associated an entry corresponding to the identifier found in a local presence roster list.

34. The system of claim 31 wherein if the identifier is not a type sufficient to obtain the presence information associated with the identified object from at least one of a presence application and a presence roster list, then the identifier is used as an index to obtain a presence URL via a look-up or mapping operation, and the presence URL is then used to obtain the presence information.

35. The system of claim 34 wherein prior to performing the lookup or mapping operation, the identifier is validated to ensure that the format of the data is correct.

36. The system of claim 26 wherein the action performed related to the object includes at least one of displaying the presence information associated with the object in response to a request to view the image, printing the presence information with the image, and playing an audio reproduction of the content of the presence information while the image is viewed.

37. The system of claim 36 wherein the presence information is displayed in a location including one of next to the image, over a location of the object in the image, and in a separate window.

38. The system of claim 36 wherein the presence information displayed includes a status associated with the at least one object.

39. The system of claim 26 comprising communication means, wherein performing an action includes using a communication address included in the presence information associated with the object to automatically open a communication channel via the communication means.

40. The system of claim 26 wherein the communication address specifies at least one contact means and corresponding at least one contact address associated with the object.

41. The system of claim 26 wherein performing an action includes displaying corresponding presence information for one or more of the at least one objects pointing to a specific location of the one or more of the at least one objects.

* * * * *